April 21, 1959 G. E. JACOBY ET AL 2,883,470

COMMUNICATION SWITCHING NETWORK

Filed Oct. 19, 1956 3 Sheets-Sheet 1

INVENTORS: G. E. JACOBY
J. W. RIEKE

BY [signature]

ATTORNEY

INVENTORS: G. E. JACOBY
J. W. RIEKE
BY
ATTORNEY

INVENTORS: G. E. JACOBY
J. W. RIEKE
BY
ATTORNEY

United States Patent Office 2,883,470

Patented Apr. 21, 1959

2,883,470

COMMUNICATION SWITCHING NETWORK

Gerald E. Jacoby, Madison, and John W. Rieke, Basking Ridge, N.J., assignors to Bell Telephone Laboratories, Incorporated, New York, N.Y., a corporation of New York Application October 19, 1956, Serial No. 617,131

41 Claims. (Cl. 179—18)

This invention relates to communication switching networks of the crosspoint type and, more particularly, to switching circuits employed in such networks.

In E. Bruce and H. M. Straube Patent 2,684,405, issued July 20, 1954, there is disclosed a distribution network in a telephone system for establishing communication paths utilizing a large number of gas tubes commonly called crosspoints. These crosspoints are connected at common connection points called nodes. In response to the application of marking voltages to the terminals of the crosspoint network a path is established through the network by the ionization of a chain or series of crosspoint devices. The necessary supervisory functions and control operations are therein set forth in a complete telephone system for the interconnection of two telephones and for the disestablishment of the talking path between them on completion of a call. The above-mentioned supervisory functions and control operations are accomplished by the operation of switches and other circuitry beyond the network terminals and remote from the crosspoint stages. In such an arrangement, however, separate control and supervisory circuits are required for the input and output terminals.

The number of stages that may be incorporated into such a switching network will determine the size of the network and the number of lines to which connections may be made by means of the network. This in turn is dependent on the margins that can be obtained to prevent false operation. This provision of adequate margins against false connections is one of the major problems in such gas tube switching networks. The false connections referred to may occur between holding path, i.e., between a tube in a priorly established path through the network and a newly marked path or tube to which the mark potentials are applied. The margins which are utilized in these networks are available by virtue of the difference between the "breakdown" and "sustain" voltages of the gas tube which is utilized as the crosspoint device of the switching network. These margins are reduced in a number of ways, such as by the variability of the gas tube characteristics and by using a larger marking voltage than required to ionize the crosspoints for the purpose of decreasing the delay in the switching operation.

This problem of adequate margins may be attacked in a number of different ways and, in fact, may probably best be attacked by utilizing a number of these different approaches in a single network. Thus, variation in breakdown potential of the crosspoint tube itself may be controlled by tube structure or processing, as disclosed in applications Serial No. 496,391, filed March 24, 1955, of A. D. White, now Patent 2,825,618, issued March 4, 1958, and Serial No. 496,431, filed March 24, 1955, of V. L. Holdaway. The gas tubes themselves are advantageously of the so called talking path type having a negative resistance in the abnormal discharge region, as disclosed in applications Serial No. 169,121, filed June 20, 1950, of M. A. Townsend, now Patent 2,804,565, issued August 27, 1957; Serial No. 583,671, filed May 9, 1956, of A. D.

White; and Serial No. 583,665, filed May 9, 1956, of R. L. Mueller and W. G. Stieritz.

Additionally, the margins may be improved by incorporating propagator circuits between stages of crosspoints in the switching network, such propagators serving to propagate marking signals applied through a preceding stage in the network and thus applying larger marking signals of predetermined magnitude to the succeeding stages of the network. The propagators may take a variety of forms, depending on their position in the switching network, the current requirements of the subsequent stages, and other factors, and may include active elements, such as a gas triode, as disclosed in application Serial No. 426,338, filed April 29, 1954, of R. W. Ketchledge, or a talking path diode, as disclosed in application Serial No. 617,060, filed October 19, 1956, of K. S. Dunlap and J. P. Taylor, now Patent 2,859,282, issued November 4, 1958, or need not include any active elements, as disclosed in application Serial No. 617,189, filed October 19, 1956, of R. W. Ketchledge, now Patent 2,859,284, issued November 4, 1958. Another approach is to employ talking path tubes in the switching network with starter gaps, as disclosed in application Serial No. 426,337, filed April 29, 1954, of R. W. Ketchledge.

Another prior suggestion of considerable value is to utilize "bisectors" or "junctors" in the middle of the switching network. These bisectors enable each half of the network to be marked and the possible paths to be broken down independently, thereby effectively, so far as the margin requirements on marking are concerned, requiring margins for only two smaller networks; effectively therefore for the same margin requirements, bisectors can be expected almost to double the possible number of switching stages. Actually the margins will fall between those of the full network and those of the half network because, although, due to the presence of the bisectors, the network is marked as two independent networks or half the number of stages, it is still held as a single network of all the stages. However, an examination of the margin problems establishes that the factors tending to reduce the margins are primarily those associated with the marking or setting up of a path through the network and only secondarily those associated with the hold conditions for maintaining that path established. The margins of the network approximate therefore those of a network of half the number of stages.

When bisectors are employed, the network is end-marked at the input and output terminals, as in simple crosspoint switching networks. Both marks progress toward the center of the network, breaking down successively gas tubes in several possible paths; advantageously, these marks may proceed through propagators interposed between successive stages, as discussed above. However, neither mark can progress beyond the bisector circuits nor can it, by itself, effect the voltages to the other side of the bisector circuits and in the other half of the switching network. The bisector circuits maintain this isolation between the two halves of the network until both marks appear at one bisector, at which time the one bisector conducts and thereby provides a low impedance path between the marked input and output terminals. Accordingly, the match between the two marks applied at the opposite terminals of the network is attained at the one bisector circuit.

In its simplest form, the bisector circuitt need be only a biased diode. This will effectively serve to divide the network in half, for marking purposes, and also attain other advantages involved in the use of bisectors, such as enabling the network to be balanced about its midpoint, that is, having the same number of stages on either side of the bisector. Such a simple bisector is disclosed in application Serial No. 617,087, filed October 19, 1956, of K. S. Dunlap, now Patent 2,859,283, issued November 4, 1958, in which application there is also disclosed a gas tube switching network not requiring internal node marking but wherein breakdown of the interior crosspoints can be controlled entirely from the mark pulses applied to the input and output terminals and wherein the gas tubes not included in the selected path are deionized automatically on establishment of the single talking path.

In such a simple bisector arrangement, the bisector serves the functions of dividing the network and acting as the match stage By this latter term is meant that a communication path through the network is first established a the two terminals of a bisector No control is exercised by this bisector over the establishment of paths through the network to insure that only one path will be established Also, no control is maintained over the path by this bisector while the path is established Further, the bisector circuit does not control the disestablishment of the communication path Also, bisector circuits of this type require all crosspoint devices in the network to be poled in the same direction, thereby requiring a wide range of applied potentials and further requiring the application of marking pulses of opposite polarity at opposite terminals of the network and requiring the application of a disconnect pulse to one of the selected terminals opposite in polarity to the marking pulse previously applied to that selected terminal.

Accordingly, it is an object of this invention to provide improved switching networks for the establishment of communication paths between marked input and output terminals.

It is another object of this invention to provide bisector circuits which regulate the establishment, maintenance, and disconnection of unitary paths through the network.

It is another object of this invention sequentially to enable bisector circuits to assure the establishment of only one path through the network.

It is another object of this invention to provide a bisector circuit which employs switching logic to connect and disconnect the gas tube crosspoints forming the communication path, to and from the associated power supply in response to marking and disconnect pulses of the same polarity.

It is another object of this invention to provide a bisector circuit which regulates the direct current for the crosspoint devices on both sides of the bisector circuit.

It is another object of this invention to provide a rapid switching circuit which minimizes the time required to establish a path through the distribution network.

It is another object of this invention to provide a bisector circuit which permits the crosspoint devices to be arranged symmetrically about the bisector thereby reducing the required range of applied potentials and permitting the use of marking and disconnect voltages of the same polarity at opposite terminals of the network.

It is another object of this invention to provide a bisector circuit which limits the alternating current in the transmission path of a crosspoint network.

It is another object of this invention to insure mark stability during the marking operation and to stabilize the incoming marking pulses from each of the opposite network terminals.

Briefly, in accordance with aspects of this invention, bisector circuits are interposed intermediate a crosspoint switching network automatically to regulate the establishment, maintenance and disconnection of communication paths through the network. Each bisector circuit employs switching logic to complete a unique path through the network only when one input and one output terminal marking pulse are present together with a bisector enabling pulse and to disconnect the path by removing the supply voltage when either terminal disconnect pulse of the same polarity as the marking pulse is present together with a nonselective release order. Further, each of these circuits provides direct current regulation as well as alternating current limiting of the transmission currents to the crosspoint devices in the established path.

In one specific illustrative embodiment of our invention, the bisector circuits employ a three input And logic circuit to actuate a first gas tube, which logic circuit assures the actuation of the first gas tube in only one bisector circuit in response to three pulses or changes in voltage. In establishing a path through the network a marking pulse is applied to one selected terminal of the network and a marking pulse of the same polarity is applied to another selected terminal on the opposite side of the network. In response to the application of these two terminal marking pulses, an enabling signal is fed to all the bisector circuits on a sequential basis. Upon the application to one bisector circuit of the mark signals from the respective terminals together with the sequential enabling pulse, a first gas tube in the one bisector circuit is ionized. This first gas tube supplies sustain current to the crosspoint devices on both sides of the bisector. Connected to each bisector circuit is a common detector circuit which delivers to the bisector control circuits one output signal indicative of the establishment of a transmission path through the network and another signal indicative of the disestablishment of this path through the network. When one path is established, the signal derived from the detector circuit indicating the establishment of the path causes the sequential scanning or enabling pulses to cease so that multiple connections are avoided. Thus, when the three voltage signals are all present, which condition can exist at only one bisector at a time, that bisector circuit performs And logic to connect the power supply to the chosen communication path. In the absence of any one of these signals at a bisector circuit, the communication path is not established through that bisector circuit. Further, since the enabling pulses from the enabling scanner or pulser are sequentially applied to all the bisector circuits, only one bisector in the network can be enabled in response to the above-mentioned two terminal marking pulses.

In accordance with other aspects of this invention, a disconnect or release voltage pulse of the same polarity and magnitude as the previously mentioned terminal mark pulses is applied to one of the previously selected network terminals. The sequential enabling scanner is not actuated for the release operation. However, another pulse source is actuated which applies a nonselective release pulse to all bisector circuits in the network. Or logic circuits are employed in combination with the nonselective release pulser to disconnect the selected path by deactivating the first gas tube in the bisector circuit in cnly the selected path. If a non-selective release pulse appears at a bisector circuit together with a terminal release pulse from either of the previously selected terminals, a second gas tube in the bisector circuit is actuated, which in turn deactuates the first gas tube previously employed to establish and maintain the communication path. In response to the deactivation of the first tube, a signal is de rived from the detector circuit and applied to the bisector release pulser to turn off the release pulser which in turn causes the second gas tube to be deionized.

Accordingly, it is a feature of this invention that each bisector circuit in a communication switching network employ an And logic circuit to control the establishment of a unitary path through the distribution network, which And circuit is responsive to an incoming mark signal from one terminal network, an incoming mark signal from an opposite terminal network, and a pair of pulses from a bisector enabling scanner. Further, in accordance with this feature of the invention, the enabling scanner sequentially actuates the bisector circuits to ensure the establishment of a unique path through the crosspoint distribution network.

It is another feature of this invention that each bisector circuit include an Or logic circuit to control the disestablishment of the unitary path through the network, which Or circuit is responsive to a pulse from either terminal of the unitary path, together with a pulse from the bisector release pulser circuit.

It is another feature of this invention to employ a current limiter in the bisector circuit to prevent deionization of crosspoints due to current surges.

It is another feature of this invention symmetrically to connect the crosspoint devices to a bisector circuit thereby reducing the range of applied potentials, presenting the same impedance to all terminals of the network and producing cancellation of the even harmonic distortion products inherent in the operation of nonlinear chains of gas discharge device crosspoints.

It is another feature of this invention to employ connect pulses of the same polarity at the selected opposite terminals of the network and to employ a disconnect pulse of the same polarity as the connect pulses to control the deactuation of the bisector circuit.

It is another feature of this invention to use a reverse breakdown diode across a choke coil to provide decoupling of the choke coil during pulsing operations as well as during alternating current surges.

It is another feature of this invention to employ a common detector circuit in combination with the bisector circuits and the common control circuits to deliver to the common control circuits one signal in response to the establishment of a unitary path through a bisector and to deliver another signal in response to the deactuation of a path.

It is still another feature of this invention to employ a direct current regulator in the bisector circuit to regulate the direct current supply to both halves of the distribution network.

It is another feature of this invention to stabilize the incoming mark pulses arriving at the bisector circuits.

It is another feature of this invention to employ a clamping circuit for surge protection of the bisectors against false operation because of voltage surges.

A complete understanding of this invention and of these and various other features thereof may be gained from consideration of the following detailed description and the accompanying drawing, in which.

Figure 1:
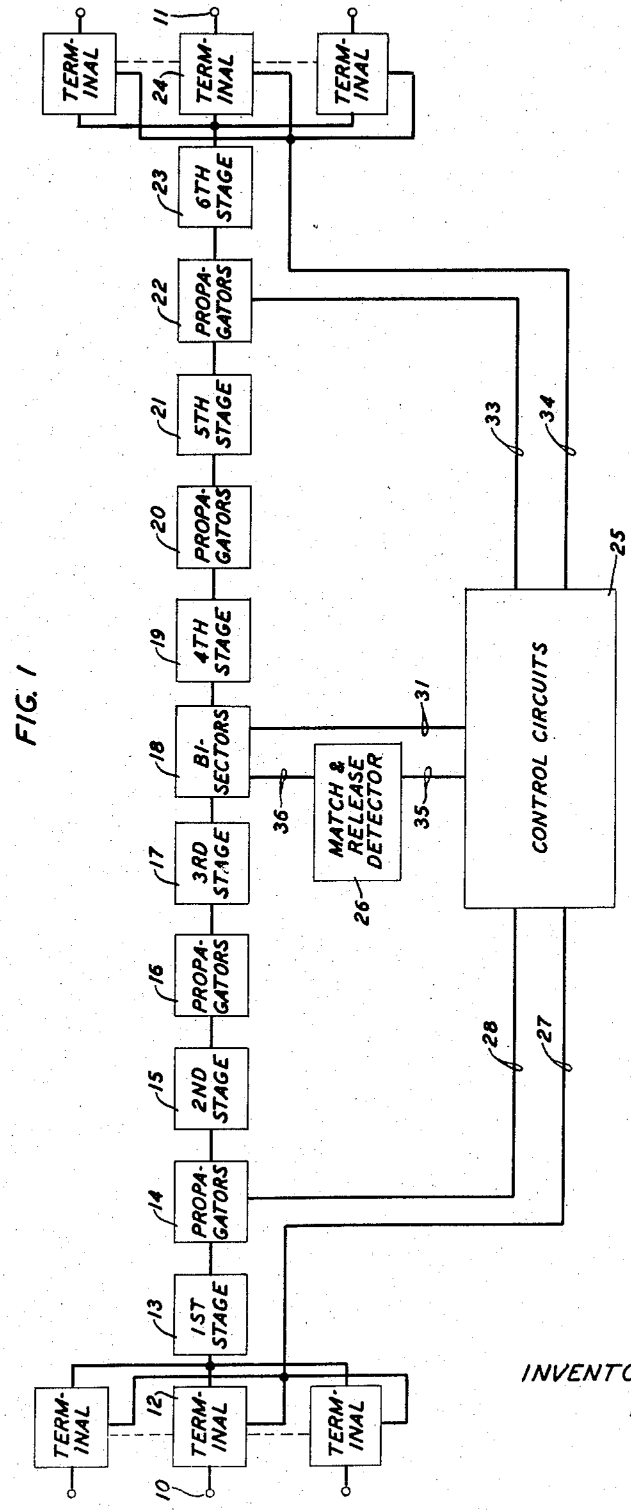
Fig. 1 shows a block diagram of a portion of the switching network in accordance with this invention.

Referring now to Fig. 1, there is depicted, in block form, a portion of a distribution network in accordance with this invention. While only one connection through the network is shown, it is understood that a crosspoint network of this type has a large number of interconnected paths, the number of paths being determined together with the number of stages in accordance with the number of simultaneous calls to be placed. The single connection shown between each of the blocks represents any convenient number of connections. For example, a terminal may be connected to ten crosspoint devices in the adjacent stage. The network as herein depicted is adapted to establish a path between connecting points, such as 10 and 11, which points are connected to terminals 12 and 24, respectively. Blocks 13, 15, 17, 19, 21 and 23 are stages of crosspoint devices which may advantageously be gas diodes as disclosed in E. Bruce and H. M. Straube Patent 2,684,405, issued July 20, 1954. Blocks 14 and 22 are propagator circuits and may advantageously be of the type disclosed and explained in detail in K. S. Dunlap and J. P. Taylor application Serial No. 617,060, filed October 19, 1956, now Patent 2,859,282, issued November 4, 1958. The nonselective propagator marking pulses for propagators 14 and 22 are supplied by a pulse source in control circuits 25 over connections 28 and 33, respectively. This pulse source may be of any convenient type and may advantageously be an astable transistor multivibrator. This multivibrator may be so connected as to operate continuously or may be so connected as to be turned on by a marking pulse on connections 27 and 34. Blocks 16 and 20 are propagator circuits and may be of the type disclosed in R. W. Ketchledge application Serial No. 426,338, filed April 28, 1954, or they may be passive propagator circuits of the type disclosed in R. W. Ketchledge application Serial No. 617,189, filed October 19, 1956, now Patent 2,859,284, issued November 4, 1958. Block 18 comprises the bisector circuits for regulating the establishment, maintenance and disconnection of a unitary path through the network. Advantageously, the distribution network is symmetrical about the bisector circuits thereby reducing the number of different values of voltage required by the network as well as permitting the application of marking and disconnecting pulses of like polarity to all terminals of the network and producing cancellation of even harmonic distortion products. The term symmetrical, as herein employed, means that the same electrode of each crosspoint device is connected nearest the bisector circuit. For example, the cathodes of all the crosspoint devices may be connected toward the bisector while the anodes of the crosspoint devices are connected toward the network terminals. Block 25 comprises the control circuits including the bisector scanner and the bisector release pulser. Block 26 is the match and release detector circuit. Both the control circuits 25 and match and release detector 26 are common to all the bisectors of the network.

The basic operation of the distribution network is to establish a path in response to the application of marking pulses of like polarity to terminals 12 and 24 and to disestablish this path in response to a disconnect pulse of the same polarity as the marking pulses on either of terminals 12 or 24. When a marking pulse is applied to terminal connector 10, a marking pulse is fed through terminal 12 to the first stage of the network and a signal is delivered along cable 27 to control circuits 25. Control circuits 25, in response to this signal, apply nonselective propagator marking pulses to cables 28 and 33 and the bisector enabling scanner applies scanning pulses through cable 31 to the bisectors. While only one bisector is shown, it is understood that one bisector is connected to each node of the third and fourth stage crosspoint devices, only one bisector being connected to each node. Control circuits 25 and match and release detector 26 are common to all bisectors. In response to these several pulses applied to the distribution network, a conductive path is established through the network between terminals 12 and 24.

When it is desired to disconnect this path, a disconnect signal in the form of another pulse of the same polarity and magnitude as the marking pulse is applied at either of terminals 12 or 24. This pulse is delivered to the release pulser through either cable 27 or 34, depending upon whether it was applied to terminal 12 or terminal 24. The release pulser, in turn, applies a disconnect pulse to the bisector circuit. This pulse applied to the bisector circuit in addition to the incoming pulse from the terminal network which progresses through the crosspoint stages to the bisector circuit causes the bisector to be deactuated and the network is restored to its initial condition, the previously employed crosspoint devices being rendered nonconductive by the removal of the terminal-to-terminal sustain currents. In addition to the abovementioned basic operations of the bisectors and associated circuits, certain supervisory and control functions are performed which will be explained in connection with Figs. 2 and 3.

Figure 2:
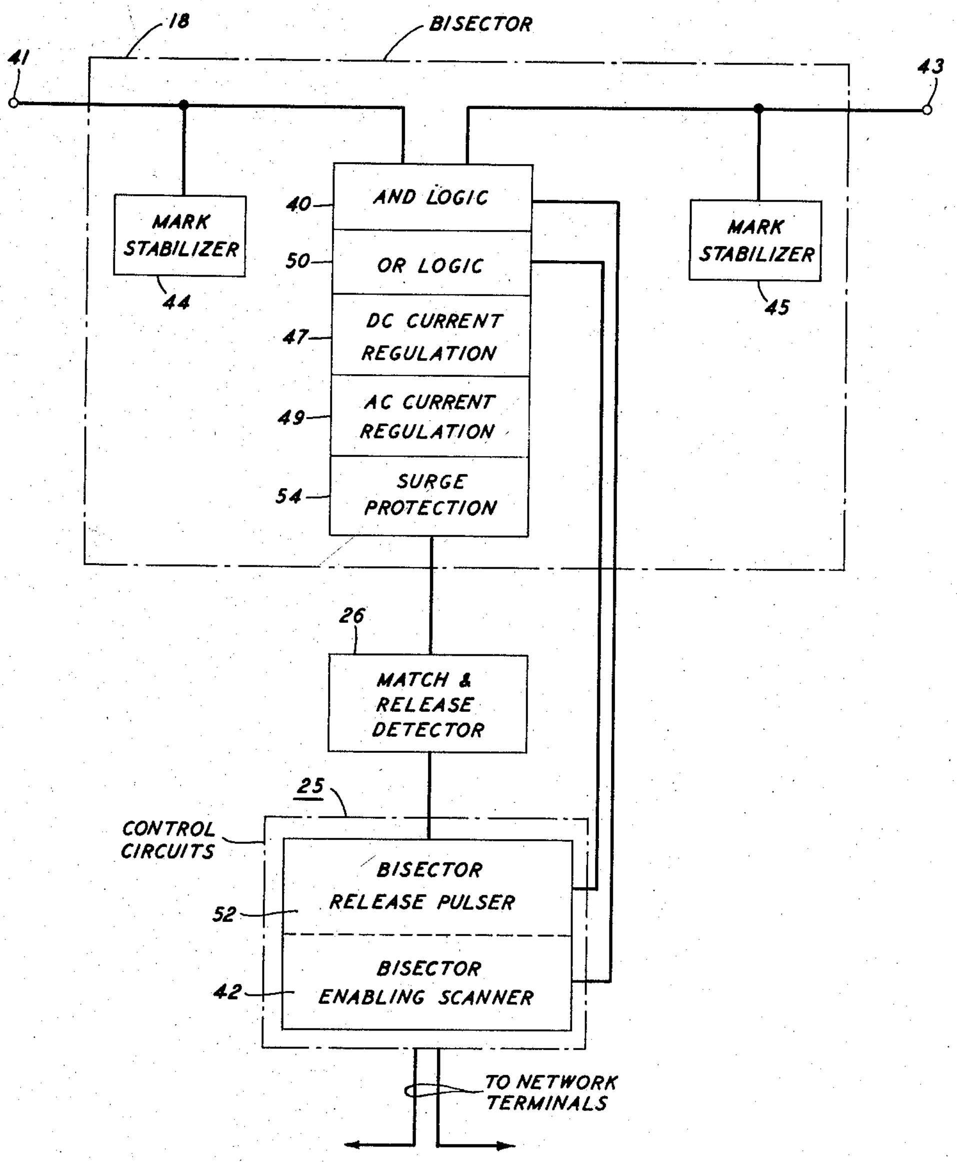
Fig. 2 shows a function block diagram of the bisector and detector circuits.
Figure 3:
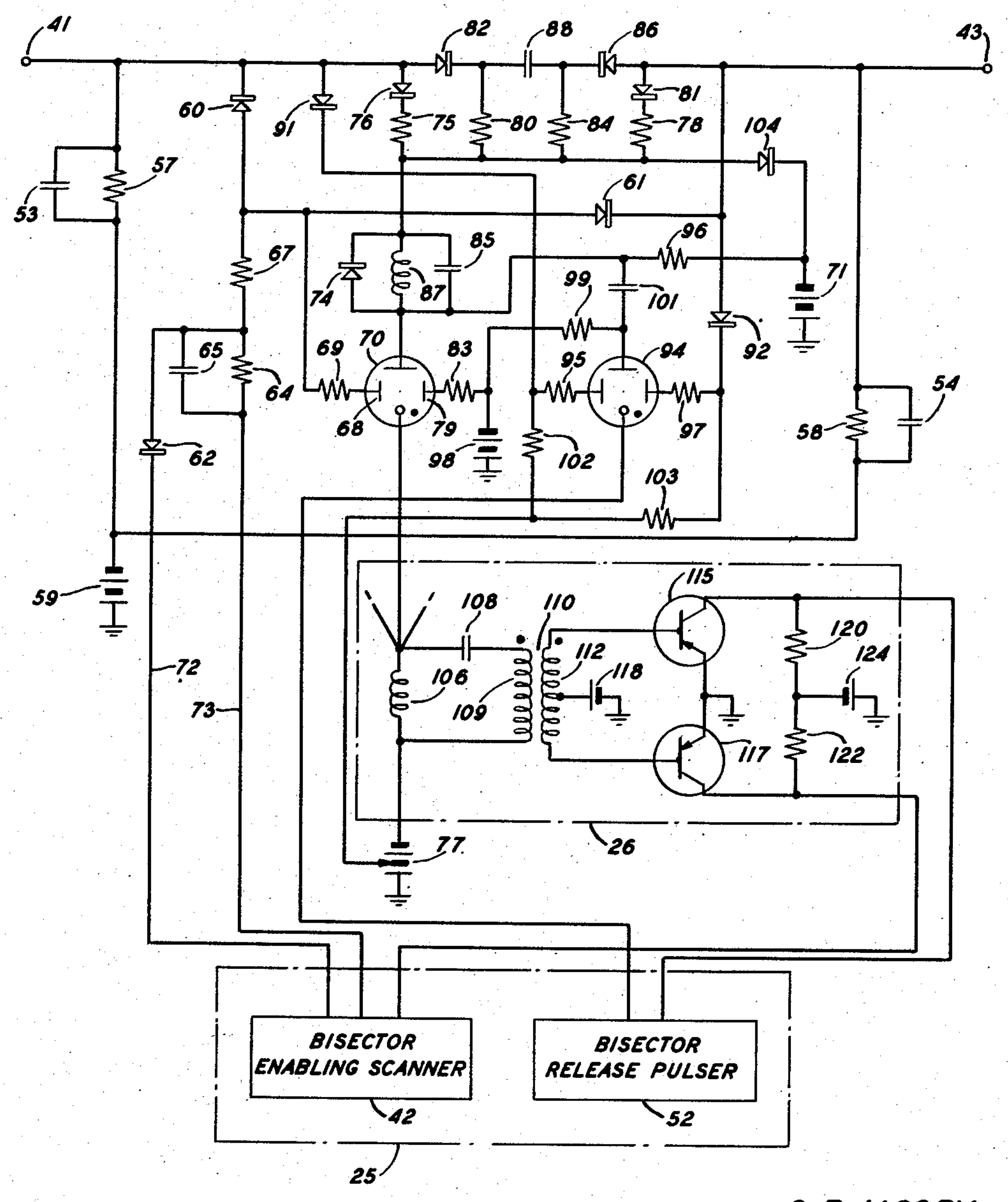
Fig. 3 is a combined schematic and block diagram of a bisector circuit together with the common detector and common control circuits, in accordance with one specific illustrative embodiment of this invention.

One specific illustrative embodiment of a bisector circuit, in accordance with our invention, is depicted in Fig. 3. To facilitate an appreciation of the operation of this specific embodiment and the performance of each of the distinct functions attained thereby, reference will first be made to Fig. 2, which is a functional diagram listing each of these distinct functions; then Fig. 3 will be discussed in terms of each of these distinct functions, even though, in accordance with our invention, these functions are attained by common elements of the combination and are all integral parts of our bisector circuit.

Referring now to Fig. 2, there is depicted a function block diagram of the bisector circuit together with block representations of the match and release detector and the control circuits. As therein illustrated, bisector terminals 41 and 43 are connected to And logic circuit 40. As employed in the network, each bisector terminal is connected to one of the adjacent crosspoint stages. For the purpose of the following explanation it is assumed that terminal 41 is connected to the third stage of crosspoint devices while terminal 43 is connected to the fourth stage of crosspoint devices. A bisector enabling scanner 42 is also connected to the And logic circuit 40. Bisector enabling scanner 42 and bisector release pulser 52 may include any convenient form of pulse controlled pulse sources known in the art. For example, the pulse source of bisector enabling scanner 42 may be a ring counter and may advantageously include And logic circuits which actuate the enabling scanner in response to pulses received over cables 27 and 34. The enabling scanner also includes circuitry for turning off the ring counter in response to a pulse delivered from match and release detector 26. Bisector release pulser 52 may be a multivibrator which is turned on by a pulse delivered through either of cables 27 or 34. The bisector release pulse also contains suitable circuitry which disables the multivibrator in response to a pulse from match and release detector 26. The input mark signals applied to the bisector terminals are under the control of mark stabilizers 44 and 45. The mark stabilizer presents a relatively low impedance path to the marking pulses to prevent the build-up of oscillations which might result in the crosspoint tubes and the associated stray capacitance as a result of the application of marking pulses. The bisector circuit further provides direct current regulation as represented by block 47, alternating current limiting as shown by block 49, and match tube surge protection as depicted in block 54. An Or logic circuit represented by block 50 controls the deactuation of the bisector circuit. Connected to the Or logic circuit is a source of nonselective release pulses 52. As previously explained, the bisector release pulser may include any convenient pulse source such as a multivibrator circuit which is adapted to be turned on by a disconnect signal delivered to the release pulser over cables 27 or 34. Bisector release pulser 52 also contains suitable circuitry for disabling the release pulse source in response to a pulse from match and release detector 26 delivered to the release pulser through cable 35. The bisector enabling scanner includes any convenient pulse source of the types well known in the art such as a ring counter which sequentially applies pulses to all of the bisector circuits of the network. Since the marking and disconnect pulses are of the same polarity, both the enabling scanner and the release pulser will be responsive to the same polarity of pulses. However, And logic circuitry which may be included in the enabling scanner will cause the pulse source of the enabling scanner to be actuated only in response to incoming marking pulses delivered over both of cables 27 and 34. Since the pulses from release pulser 52 are insufficient alone to cause the release of a bisector in an established path, as will be subsequently explained, it is permissible for the release pulser to apply a release pulse to all of the bisectors in the network in response to the application of marking pulses received over both of cables 27 and 34. If, however, it is desired that the release pulser remain deactuated during the establishment of a path, the release pulser may contain suitable circuitry for inhibiting the operation of the release pulse source when marking pulses are received over both of cables 27 and 34, which circuitry would permit the actuation of the release pulse source in response to only one disconnect pulse received over either of cables 27 or 34. A circuit for detecting the establishment and disestablishment of a communication path is depicted by block 26 entitled "Match and Release Detector." The release and match detector is connected to block 25, entitled "Control Circuits," which is not a portion of the bisector circuit.

Fig. 3 depicts a combined schematic and block diagram of a bisector circuit as well as the associated circuits which are common to all the bisector circuits. These common circuits, in accordance with one specific embodiment of this invention, include the match and release detector and the control circuits. The control circuits include two pulse sources, the bisector enabling scanner and the bisector release pulser.

The following is a discussion of Fig. 3 in accordance with the functions performed by the circuits represented in Fig. 3 either in block or schematic form, which functions were shown in Fig. 2.

*Input mark stabilizers*

The input mark stabilizer includes circuitry connected to each of the input terminals of the bisector circuit to stabilize the incoming marking pulses. These stabilizers are represented in Fig. 2 by blocks 44 and 45. In the specific embodiment depicted in Fig. 3, this stabilization is accomplished by source 77 of potential, diodes 91 and 92 and resistors 102 and 103 which may be of the order of .05 megohm.

The mark pulse stabilizing circuit is a form of clipping circuit and presents, to voltages above a predetermined magnitude, a low impedance path through either diode 92 and resistor 103 or diode 91 and resistor 102 to prevent the build-up of oscillations which might occur in the preceding crosspoint tubes in response to the marking pulses.

*And logic*

The And logic circuit is connected to both of the bisector input terminals and includes diodes 60, 61 and 62 connected respectively to terminals 41, 43 and bisector enabling scanner 42. Enabling scanner 42 may be a multivibrator of the astable type which sequentially applies pulses to all the bisectors and this multivibrator may be controlled through suitable And logic in response to pulses from the network terminals over connections or cables 27 and 34 (shown in Fig. 1). Also connected between bisector enabling scanner 42 and the And logic circuit is resistor 64 and capacitor 65. Resistor 64 presents as high an impedance as the transfer characteristic of tube 70 will allow. Capacitor 65 sharpens the enabling pulse transmitted on a low current basis through resistor 64 while capacitors 53 and 54 absorb the initial voltage surges through capacitor 65. In the event of short-circuit failure of either diode 60 or 61, resistor 69 protects starter electrode 68 of tube 70 while resistor 67 protects enabling scanner 42. Advantageously, this high impedance pulsing path permits the application of pulses to the And logic circuit without introducing noise or disturbing pulses in the crosspoints connected to established paths. This absence of disturbance is further assured by capacitors 53 and 54 which absorb any pulses from the enabling scanner which reach the bisector terminals as was previously explained. In response to simultaneous pulses from bisector enabling scanner 42 through conductors 72 and 73, diode 62 becomes back-biased and a pulse is applied through resistor 64, which pulse is sharpened by capacitor 65 and applied to resistor 67. If an incoming mark pulse is not present on terminal 41 or terminal 43, then the associated diode 60 or 61 will be conducting and this sharpened pulse from the bisector scanner will pass through the diode to which no marking pulse has been applied and return to source 59 of potential through either resistor 57 or resistor 58. If, however, marking pulses are applied to both terminals 41 and 43, diodes 60 and 61 will be back-biased and the sharpened scanning pulse will be delivered through resistor 69 to starter anode 68 of match tube 70 and cause the ionization of the match tube. The delay normally present between the application of the pulse to starter anode 68 and the ionization of tube 70 is decreased because of a partial ionization within the tube. This partial ionization is provided by a direct current potential applied to starter electrode 79 through resistor 83 by source 98 of potential.

While sources 59, 71, 77 and 98 of potential are represented as having their positive terminals grounded, these polarities are merely symbolic and proper operation of the gas tubes is nevertheless assured by causing the cathodes of the gas tubes to be more negative than the anodes. For example, source 77 of potential may normally maintain the cathode of tube 70 at −462 volts while source 71 may normally maintain the main anode of tube 70 at −247 volts.

The transfer of the ionization of the match tube 70 to the main gap defining electrodes closes the circuit between the source 77 of potential connected to the cathode of match tube 70 and bisector terminals 41 and 43. Since source 77 of potential is connected in parallel with the communication path by the bisector circuit, it is essential to decouple source 77 at communication frequencies. The available series resistance is insufficient to insure a low transmission loss. Choke coil 87 is therefore connected in series with the main anode of tube 70 and the communication path. The impedance presented by the choke coil is further increased by capacitor 85 connected in parallel with coil 87, which capacitor resonates with coil 87 in the middle frequencies of the communication band, thus presenting a high impedance to communication currents. Now all parallel impedances, required in the operation of the And logic circuit, are isolated from the talking path by the choke coil impedance.

During the match and disconnect operations, choke coil 87 must be decoupled to prevent large voltage surges across it. Advantageously, this decoupling is achieved by connecting a reverse breakdown diode 74 in parallel with coil 87. Reverse breakdown diode 74 has a low forward impedance and a high reverse impedance up to a value called the "saturation or breakdown voltage." For reverse voltages beyond this value, the current undergoes large increases for small further increases in voltage. Thus, saturation or breakdown diode 74 provides bilateral decoupling of choke coil 87 to large pulses generated during the marking and disconnecting operations. It is to be noted that the reverse breakdown diode must be able to carry the entire match and release current in the reverse direction during the time interval determined by the time constant of choke coil 87. A more detailed discussion of reverse breakdown or reference voltage diodes may be found on page 833, volume 33, number 4 of The Bell System Technical Journal, July 1954.

The completion of the circuit between source 77 and terminals 41 and 43 through tube 70 applies holding potential to terminal 41 through resistors 75 and 80 and diodes 76 and 82. Similarly, tube 70 applies holding potential to terminal 43 through resistors 78 and 84 and diodes 81 and 86.

*Direct current regulation*

In order to insure proper holding of an established path, the direct current supplied to both halves of the path is regulated. In accordance with another aspect of our invention, such regulation is attained and maintained between specified limits. Specifically, in accordance with an aspect of our invention, direct current is maintained through the bisector by certain of the elements of the bisector circuit even on a momentary interruption of the transmitted current which would otherwise cause an erroneous disconnect. Specifically, in the embodiment of our invention depicted in Fig. 3, resistors 75 and 78 together with their associated parallel connected resistors 80 and 84, respectively, serve independently to regulate the direct current supplied to each half of the network. The choice of values for the resistors for each parallel combination is determined by the cumulative variation of sustain voltage of the crosspoints and the permissible holding current variations to insure satisfactory transmission characteristics.

Advantageously, resistor 75 may be approximately one half the value of resistor 80. Accordingly, two thirds of the hold current to terminal 41 flows through diode 76 while the remainder flows through diode 82. A similar relationship may exist between resistors 78 and 84 such that approximately two thirds of the hold current is supplied to terminal 43 through diode 81 while the remainder flows through diode 86.

Protection is provided against deionization due to reduction of the hold current supplied by the bisector as follows. If an incoming pulse of current is received at terminal 43 after a path has been established through the bisector, this pulse passes through diode 86 and capacitor 88 to diode 82 causing diode 82 to be back-biased. When diode 82 becomes back-biased, the current previously flowing through resistor 80 and diode 82 is interrupted. The crosspoint devices connected to terminal 41 will be sustained in spite of the interruption of a portion of the current since approximately two thirds of the current to these devices is relatively unaffected and continues to flow through resistor 75 and diode 76. The direct current delivered to terminal 43 is similarly regulated during incoming pulses from terminal 41.

*Alternating current limiting*

Alternating current limiting is also necessary to prevent driving the crosspoint devices in a half section of the established path into the unstable region of the negative resistance characteristic and to prevent partial disconnects due to excessive current surges. The alternating current limiting circuit is represented in Fig. 2 by block 49 and includes diodes 82 and 86 and resistors 75, 78, 80 and 84 shown in Fig. 3. As previously mentioned in the explanation of the direct current regulating circuit, a surge of voltage arriving at bisector terminal 41 will be transmitted through diode 82 and capacitor 88 to diode 86. If this voltage surge is insufficient to back-bias diode 86, the surge will result in increased current flow through diode 86 and a resultant pulse delivered to terminal 43. However, if this incoming pulse is sufficient to back-bias diode 86 then, in this particular example, this surge will not be transmitted through the diode at amplitudes greater than approximately one third of the hold current. Thus, the ratio of the values of resistors 78 and 84 now determines the level of alternating current limiting. Similarly, pulses arriving at bisector input terminal 43 will be limited by diode 82 and resistors 75 and 80.

In addition to the above circuitry, the reverse breakdown diode 74 aids in the alternating current limiting. The alternating current voltage developed across choke coil 87 cannot exceed the breakdown voltage of diode 74. The voltage developed across this common impedance (choke coil 87 and diode 74) is insufficient to back-bias either of diodes 76 and 81.

*Or disconnect logic*

After the communication is completed, an Or logic circuit is actuated to effect a disconnect. In Fig. 2, block 50 designates an Or logic disconnect circuit. This logic circuit deactuates the bisector circuit in response to nonselective release pulse from bisector release pulser 52 in combination with an incoming disconnect pulse from either of bisector terminal 41 or 43. In the specific embodiment depicted in Fig. 3, the Or logic circuit includes diodes 91 and 92, the two starter electrodes of disconnect gas tube 94 and resistors 95 and 97 serially connected between diodes 91 and 92 and the associated starter electrodes. Source 98 is connected through resistor 99 to the main anode of disconnect or release tube 94 while the bisector release pulser is connected to the main cathode of gas tube 94. Source 77 supplies positive bias to the starter electrodes of tube 94 through resistors 102 and 103.

After the communication is completed, a disconnect pulse is applied to either terminal 10 or 11 of Fig. 1 to cause disestablishment of the path. In response to this disconnect pulse which is of the same polarity as the mark pulse, a pulse is transmitted by the associated terminal 12 or 24, as the case may be, both to control circuits 25 and to the adjacent stage of the crosspoint network. In response to the pulse applied to the control circuits, bisector release pulser 52 simultaneously pulses all the cathodes of the bisector release tubes 94. In response to the release pulse transmitted by the adjacent stage of the crosspoint network, a pulse is transmitted to one terminal of the bisector network. Assume that this pulse is applied to terminal 43; the pulse reaching terminal 43 passes through diode 92 and resistor 97 to the associated starter electrode of gas tube 94. This pulse superimposed on the positive bias normally applied by source 77 to the start electrode of tube 94 together with the pulse from bisector release pulser 52 applied to the cathode causes tube 94 to ionize. In response to the ionization of tube 94 the anode potential of tube 94 drops, rapidly discharging capacitor 101. The discharge current pulse through capacitor 101 flows partly through resistor 96 but mainly from the anode of tube 70 connected to the opposite terminal of capacitor 101, which pulse lowers the anode potential of tube 70 and thereby reduces the potential across the main gap defining electrodes of that tube below the sustain potential. This current will continue to flow until capacitor 101 is fully recharged by current from source 71 or until the bisector release pulser 52 removes the pulse from the cathode of release tube 94. Advantageously, capacitor 101 is sufficiently large to bypass the current from match tube 70 for a sufficient time to deionize the match tube. For example, this may be about 250 microseconds. In response to the decrease in current through match tube 70, a pulse is delivered from the match and release detector to the bisector release pulser. This pulse turns off the bisector release pulser which in turn causes disconnect tube 94 to deionize by interrupting the release pulse applied to the cathode of tube 94.

In response to the deionization of tube 70, the unique path hold current is interrupted. Since the transmission path is disestablished at its mid-point, the cross-point devices in both halves of the path become nonconducting, restoring the network path to its idle condition and making the nodes available for other communication paths.

*Match tube surge protection*

Source 71 is connected through diode 104 and inductor 87 to the anode of match tube 70. Diode 104 and source 71 act as a clamping circuit to clamp the value of the incoming mark pulses passing through diodes 76 and 81 to the anode of the match tube. One of these incoming mark pulses might otherwise be sufficient alone to cause ionization of match tube 70. Also, when disconnect tube 94 deionizes a pulse is transmitted through capacitor 101 to the anode of match tube 70. Again diode 104 and source 71 limit the value of this pulse to a value insufficient to ionize match tube 70.

*Match and release detector*

In order to reduce the operating period of the control circuits, feedback signals are provided by the match and release detector circuit 26 to deactuate certain of the control circuits in response to the establishment or disestablishment of a communication path through the network. The match and release detector enclosed by block 26 in Fig. 3 is common to all bisector circuits and delivers discrete signals to control circuits 25 in response to the actuation or deactuation of a bisector circuit. Inductor 106 is serially connected between a source 77 of potential and the cathodes of each match tube 70 of the bisector circuits. Connected in parallel with inductor 106 is capacitor 108 and the primary winding 109 of transformer 110. The secondary winding 112 of transformer 110 is connected to each of the bases of transistors 115 and 117. The emitter of each of these transistors is connected to ground while the center tap of secondary winding 112 is connected to source 118 of positive potential. Resistors 120 and 122 are connected between source 124 of negative potential and the collectors of transistors 115 and 117, respectively. While these transistors are depicted as n-p-n transistors, it is understood that p-n-p transistors may be substituted provided the connections to sources 118 and 124 are reversed. Transistor 115 delivers a release signal from its collector to control circuits 25 while transistor 117 delivers from its collector a match signal to control circuits 25 in a manner which will be subsequently explained.

When a bisector match tube ionizes in response to an incoming pair of pulses from the terminals of the bisector together with pulses from the bisector enabling scanner in a manner previously explained, a pulse is developed across inductor 106, which pulse appears across primary winding 109. This pulse is applied, because of its polarity, to the base of transistor 117, causing transistor 117 to become conducting. In response to the conduction of transistor 117, a match indicating pulse is delivered through the collector of transistor 117 to control circuits 25. When a match tube is deionized by the actuation of tube 94, a pulse is developed across inductor 106 opposite in polarity to the previous pulse developed across inductor 106. This pulse is applied through secondary winding 112 of transformer 110 to the base of transistor 115 causing transistor 115 to become conducting. In response to the conduction of transistor 115, a disconnect indicating pulse is delivered from the collector of transistor 115 to control circuits 25. The match indicating signals delivered from transistor 117 to control circuits 25 are employed to stop the scanning operation of bisector enabling scanner 42 while the disconnect indicating signals delivered from transistor 115 to control circuits 25 are employed to disable bisector release pulser 52. By utilizing these feed-back paths presented by the match and release detector, the control circuits are actuated for a minimum period thereby increasing the number of calls which can be established through the network. For example, the enabling scanner may operate at 20 kilocycles per second, sequentially applying pulses to the bisectors for a period of 50 microseconds. The operation of the match and release detector would turn the enabling scanner off before the end of the 50 microsecond pulse thereby permitting the control circuits to be utilized to establish another transmission path through the network.

It is to be understood that the above-described arrangements are illustrative of the application of the principles of the invention. Numerous other arrangements may be devised by those skilled in the art without departing from the spirit and scope of the invention.

What is claimed is:

1. A communication switching network including a plurality of input terminals, a plurality of output terminals, crosspoint devices defining paths between each of said input terminals and each of said output terminals, each of said paths including at least two of said crosspoint devices, a plurality of bisector means interposed between certain of said crosspoint devices for regulating the establishment, maintenance and disconnection of unitary paths through said network, and control means for applying enabling and release pulses to said plurality of bisectors.

2. A communication switching network in accordance with claim 1 wherein said control means includes means for sequentially pulsing said plurality of bisector means in response to the application of marking pulses to one of said input and one of said output terminals, and means for applying a release pulse to said plurality of bisector means in response to the application of a disconnect pulse to one of said terminals.

3. A communication switching network in accordance with claim 1 further including detector means connected to said plurality of bisector means and to said control means, means for delivering a first control signal from said detector means to said control means in response to the establishment of a path through said network, and means for delivering a second control signal from said detector means to said control means in response to the disestablishment of a path through said network.

4. A communication switching network in accordance with claim 1 wherein said control means includes a first source of pulses actuated by the application of marking pulses of like polarity to one of said input terminals and one of said output terminals to deliver enabling pulses to said plurality of bisector means and a second source of pulses to deliver a release pulse to said plurality of bisector means in response to a disconnect pulse of the same polarity as said marking pulses on one of said selected terminals.

5. A communication switching network in accordance with claim 1 wherein said bisector means includes means for regulating the direct current delivered to the adjacent crosspoint devices by said bisector means.

6. A communication switching network in accordance with claim 1 wherein said bisector means includes means for limiting the alternating current in said paths.

7. A communication switching network in accordance with claim 1 wherein said crosspoint devices are symmetrical about said bisector means thereby permitting said marking and said disconnect pulses to be of the same polarity.

8. A communication switching network in accordance with claim 1 further including impedance means in each of said bisector means for isolating a portion of said bisector means from communication currents and further including voltage responsive means for decoupling said impedance means during the establishment and disestablishment of a path through said bisector means.

9. In a switching circuit, a plurality of input terminals, a plurality of output terminals, crosspoint devices defining paths between each of said input terminals and each of said output terminals, a plurality of bisector means connected between said crosspoint devices for regulating the establishment, maintenance and disconnection of unitary paths including said devices, logic means in each of said plurality of bisector means, and control means for pulsing each of said logic means, said logic means including And logic means for actuating said bisector means in response to pulses from one of said input and one of said output terminals and from said control means.

10. In a switching circuit in accordance with claim 9, said logic means further including Or logic means for deactuating one of said bisector means in response to a disconnect pulse from either one of said terminals and a release pulse from said control means.

11. In a switching circuit in accordance with claim 9, means in each of said bisector means for limiting the alternating current in the communication path.

12. In a switching circuit in accordance with claim 11 wherein said means for limiting the alternating current includes a pair of oppositely poled serially connected diodes interposed in said communication path.

13. In a switching circuit in accordance with claim 12, means in each of said bisector means for regulating and maintaining the direct current delivered to the crosspoints adjacent said bisector means.

14. In a switching circuit in accordance with claim 13, said direct current regulating and maintaining means including a direct current path connected at its one end to both sides of each of said oppositely poled diodes and the other ends of said paths being connected together.

15. In a switching network for establishing a plurality of communication paths, a plurality of input terminals, a plurality of output terminals, crosspoint devices arranged in stages between each of said plurality of input and output terminals, a plurality of bisector circuits intermediate the crosspoint stages of the network, each of said bisector circuits including a first and a second gaseous discharge device and each of said devices having an anode, a cathode, and starter electrode means, an And logic circuit connected between said starter electrode means of said first device and the adjacent stages of said network, and means connecting said second device to adjacent stages of said network, control means common to said plurality of bisector circuits, means for applying a pulse from said control means to said And circuit whereby said first device is actuated on occurrence of marking pulses applied to one of said input and output terminals and an enabling pulse, means applying a pulse from said control means to said second device, and means connecting said second device to said first device to disestablish conduction through said first device on establishment of conduction through said second device.

16. In a switching network in accordance with claim 15 wherein said second gas discharge device has a pair of starter electrodes, each of said starter electrodes being connected to one of the adjacent crosspoint stages, whereby said second gas discharge device is actuated by the application of a disconnect pulse from either adjacent stage to one of said starter electrodes together with a release pulse from said second pulse source means.

17. A circuit for regulating the establishment, maintenance and disconnection of a unitary path through a distribution network of crosspoint devices arranged in stages including a plurality of bisector circuits, means connecting said bisector circuits to adjacent stages of the crosspoint network, enabling pulse means for supplying enabling pulses to each of said plurality of bisector circuits, one of said enabling pulses, together with marking pulses transmitted through said adjacent stages, actuating one of said bisector circuits, release pulse means for supplying a release pulse to each of said bisector circuits which release pulse combines with a disconnect pulse from one of said adjacent stages for disabling one of said bisector circuits and detector means for deriving a signal from said bisector circuits in response to the enabling and disabling operations, said detector means being adapted selectively to deliver control signals to both said pulse means.

18. A circuit in accordance with claim 17 wherein each of said bisector circuits includes And logic means connected to the adjacent stages of crosspoints and to said enabling pulse means, and means connected to the output of said And logic means for controlling the actuation of the associated bisector circuit in response to marking pulses from said adjacent stages together with an enabling pulse from said enabling pulse means.

19. A circuit in accordance with claim 18 wherein said enabling pulse means sequentially applies pulses to said And logic means and wherein said detector means is connected to each of said bisector circuits and connected to said control means for controlling said enabling pulse means whereby said enabling pulse means is deactuated in response to the establishment of a path through one of said bisector circuits.

20. A communication switching network including a plurality of gaseous discharge device crosspoints arranged in stages, a plurality of bisector circuits, said crosspoint devices being symmetrically arranged with respect to said bisector circuits, and control means for delivering enabling and release pulses to said bisector circuits to enable establishment of a unique transmission path through the network and disestablishment of said path.

21. A communication switching network in accordance with claim 20 wherein each of said bisector networks includes a transmission path therethrough, said path including a capactitor and a pair of oppositely poled diodes on opposite sides of said capacitor.

22. A network in accordance with claim 21 wherein each of said bisector circuits includes means for stabilizing the marking pulses received from the crosspoint devices on both sides of said bisector circuits.

23. A network in accordance with claim 21 wherein each of said bisector circuits includes means for preventing false operation of said bisector circuit because of voltage surges, which voltage surges may be either generated within the bisector circuit or delivered to the bisector circuit.

24. A network in accordance with claim 21 wherein each of said bisector circuits includes first impedance means common to the crosspoint devices on both sides of said bisector circuit for decoupling a portion of said bisector circuit from transmission currents and second impedance means connected to said first impedance means means for providing a low impedance pulse by-pass relative to said first impedance means.

25. A network in accordance with claim 24 wherein said first impedance means includes an inductance and wherein said second impedance means includes a saturation diode connected in parallel with said inductance.

26. A circuit for regulating the establishment, maintenance and disconnection of unitary paths through a network of crosspoint devices including bisector means connected intermediate said crosspoint devices, detector means connected to said bisector means and control means connected to said bisector means and to said detector means for applying enabling and release pulses to said bisector means whereby said detector means applies pulses to said control means in response to the actuation and deactuation of said bisector means.

27. A circuit in accordance with claim 28 wherein said bisector means includes means to regulate the direct current supplied to the crosspoint devices on both sides of said bisector means.

28. A bisector circuit for a communication switching network comprising an input and an output terminal, a transmission path between said terminals and including a capacitor, oppositely poled diodes in said path on opposite sides of said capacitor, a gaseous discharge device, a plurality of paths connected between said device and said transmission path, said paths including first paths including a resistor and a diode connected to each of said terminals and second paths including a resistor connected to each side of said capacitor, and means for recognizing mark signals at said terminals and ionizing said device in response thereto.

29. A bisector circuit in accordance with claim 28 wherein said resistors in said first and second paths are of unequal value of resistance whereby direct current flowing between said terminals unequally divides between said paths.

30. A bisector circuit in accordance with claim 29 wherein the resistors of said first path are of approximately half the resistance of said resistors of said second path.

31. A bisector circuit in accordance with claim 28 further comprising a clamping diode connected between said paths and said device and means for applying a limiting voltage to said clamping diode.

32. A bisector circuit in accordance with claim 28 further comprising a decoupling network interposed between said first and second paths and said device, said network including a saturation diode and a choke coil connected in parallel with said saturation diode.

33. A bisector circuit in accordance with claim 32 wherein said decoupling network further comprises a capacitor connected in parallel with said coil, said capacitor and coil being resonant at substantially the middle frequency of the communication signals transmitted along said transmission path.

34. A bisector circuit for a communication switching network comprising an input and an output terminal, a transmission path between said terminals and including a capacitor, oppositely poled diodes in said path on opposite sides of said capacitor, a gaseous discharge device, diode means connected between said terminals and said device for effecting ionization of said device on appearance of marking signals at said terminals, and means for providing a path for conduction of direct current between said terminals on ionization of said device to establish transmission along said transmission path, said direct current path also including said oppositely poled diodes.

35. A bisector circuit in accordance with claim 34 wherein said last-mentioned means includes a voltage source connected to said device, said bisector circuit further comprising impedance means connected between said device and said source, and means connected to said impedance means for generating control signals on changes of current through said device.

36. A bisector circuit in accordance with claim 34 further comprising enabling pulse means connected to said diode means, whereby ionization of said device is effected only on the joint appearance of marking signals at said terminals and an enabling pulse from said enabling pulse means.

37. A bisector circuit for a communication switching network comprising an input and an output terminal, a transmission path between said terminals and including a capacitor, oppositely poled diodes in said path on opposite sides of said capacitor, means for biasing said diodes and providing a path for conduction of direct current to establish transmission along said transmission path, said last-mentioned means including a first gaseous discharge device and means for establishing ionization in said device, a second gaseous discharge device, a diode connected to each of said terminals and to said second gaseous discharge device, means for establishing conduction in said second gaseous discharge device on appearance of a disconnect signal at either of said terminals, and means for extinguishing conduction in said first device on conduction in said second device.

38. A bisector circuit in accordance with claim 37 wherein said means for establishing conduction in said second device further comprises release pulse means for applying a signal to the cathode of said second device.

39. A bisector circuit for a communication switching network comprising an input and an output terminal, a transmission path between said terminals and including a capacitor, oppositely poled diodes in said path on opposite sides of said capacitor, a first gaseous discharge device, a plurality of paths connected between said device and said transmission paths, said paths including first paths including a resistor and a diode connected to each of said terminals and second paths including a resistor connected to each side of said capacitor, diode means connected between said terminals and said first device for effecting ionization of said first device on appearance of marking signals at said terminals, means for biasing said oppositely poled diodes and said diodes in said first paths on ionization of said first device to effect conduction of direct current therethrough to establish transmission along said transmission path, a second gaseous discharge device, a diode connected to each of said terminals and to said second gaseous discharge device, means for establishing conduction in said second gaseous discharge device on appearance of a disconnect signal at either of said terminals, and means for extinguishing conduction in said first device on conduction of said second device.

40. A bisector circuit in accordance with claim 39 wherein said resistors in said first and second paths are of different values of resistance and further comprising a clamping diode connected between said paths and said first device, means for applying a limiting voltage to said clamping diode, and a decoupling network interposed between said first and second paths and said first device, said network including a saturation diode, a choke coil, and a capacitor connected in parallel.

41. A bisector circuit in accordance with claim 39 further comprising first enabling pulse means connected to said diode means whereby ionization of said first device is effected only on the joint appearance of marking signals at said terminals and an enabling pulse from said enabling pulse means, and wherein said means for establishing conduction in said second device further comprises second pulse means for applying a release signal to said second device.

No references cited.